United States Patent [19]

Griffin

[11] 4,346,621
[45] Aug. 31, 1982

[54] POWER TRANSMISSION APPARATUS
[75] Inventor: William T. Griffin, Indian Trail, N.C.
[73] Assignee: Automated Energy Systems, Inc., Matthews, N.C.
[21] Appl. No.: 940,177
[22] Filed: Sep. 7, 1978
[51] Int. Cl.³ .................. F16H 37/06; D06H 3/12
[52] U.S. Cl. ...................... 74/665 G; 26/51.4
[58] Field of Search ................ 26/51.4, 51.5; 74/665 G

[56] References Cited
U.S. PATENT DOCUMENTS

| | | | |
|---|---|---|---|
| 9,452 | 11/1880 | Palmer | |
| 2,219,213 | 10/1940 | Swain | 26/51.5 |
| 2,421,575 | 6/1947 | Nield | 427/67 |
| 2,906,143 | 9/1959 | Musser | 74/640 |
| 2,931,249 | 4/1960 | Musser | 74/640 |
| 3,482,770 | 12/1969 | Nelson | 184/66 |
| 3,487,722 | 1/1970 | Cline | 74/675 |
| 3,636,598 | 1/1972 | Hannaway | 26/51.4 |
| 3,839,767 | 10/1974 | Leitner | 26/51.1 |
| 3,958,736 | 5/1976 | Pounds | 226/3 |

*Primary Examiner*—Robert Mackey
*Attorney, Agent, or Firm*—Bell, Seltzer, Park & Gibson

[57] ABSTRACT

A power transmission which includes two harmonic differential drive units which are operable to oppositely vary the rotational speed of the two outputs in direct proportion to each other. The transmission is particularly suitable for use in controlling the two drive chains of a tenter so as to correct skew distortions in the fabric, and wherein the output of the tenter chains is oppositely varied without altering the mean speed of the two chains.

4 Claims, 8 Drawing Figures

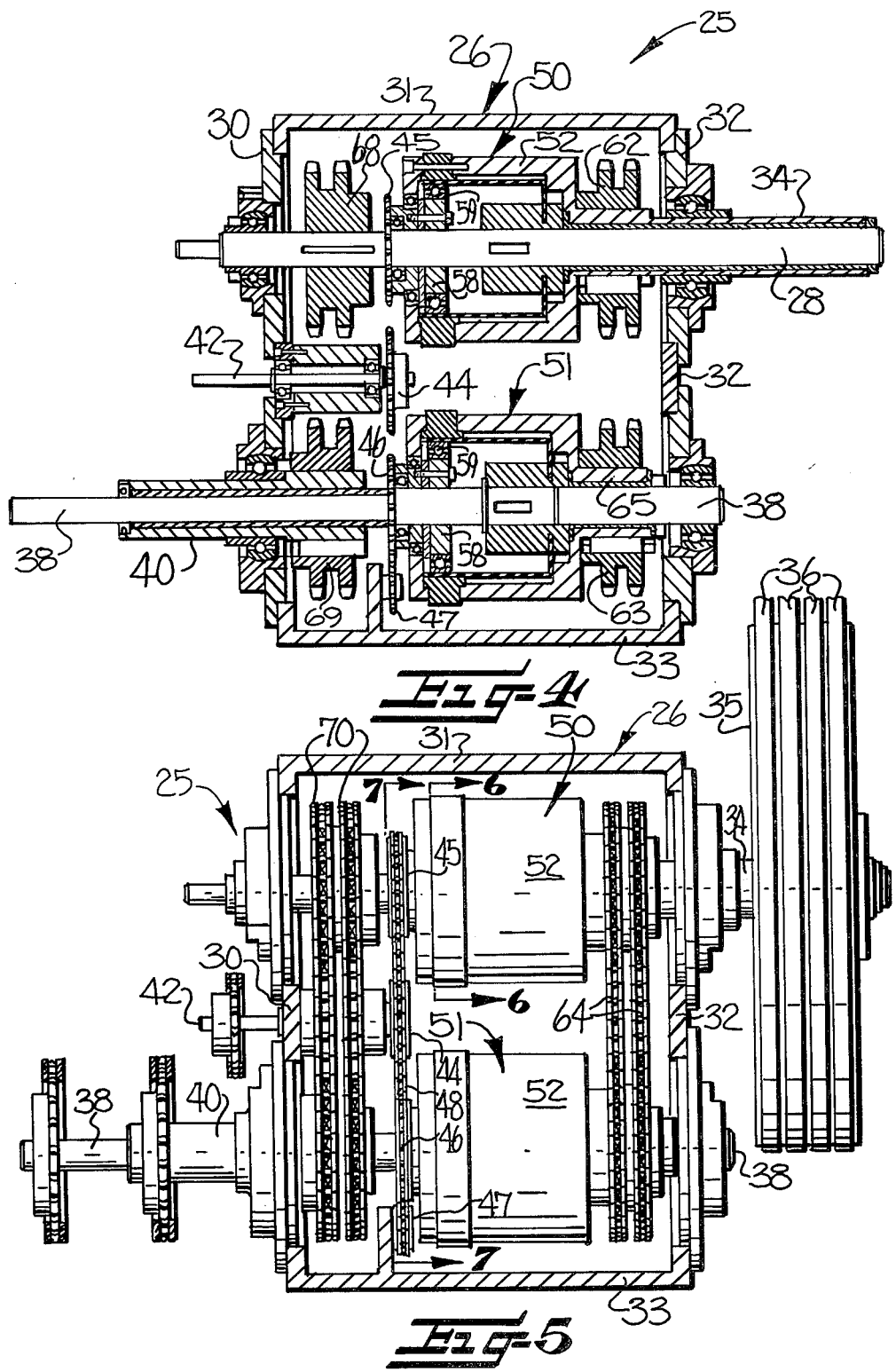

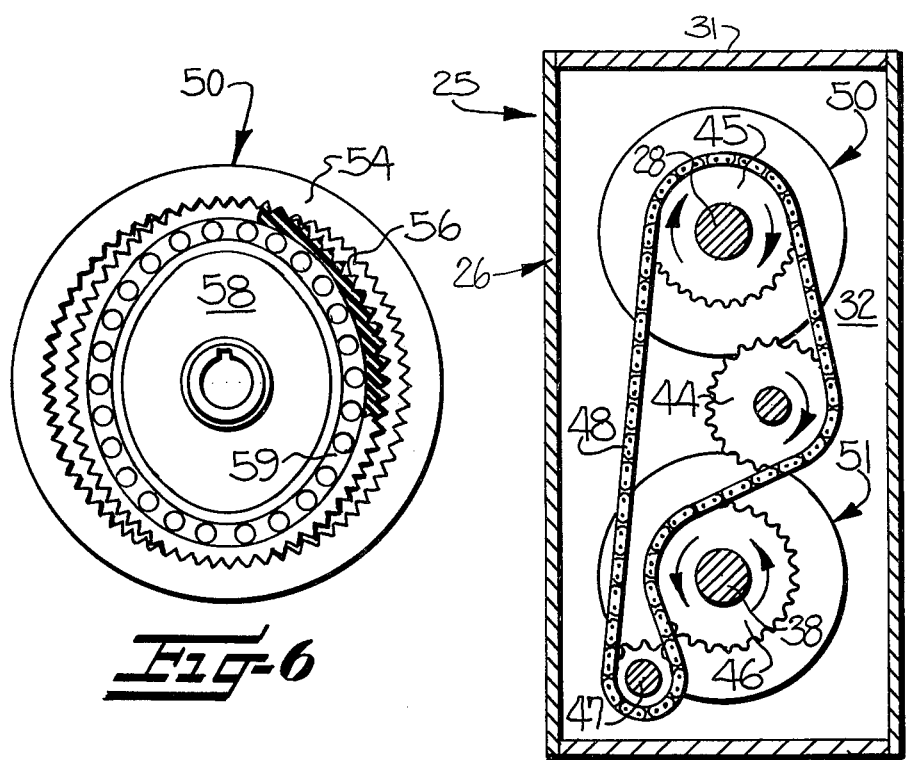
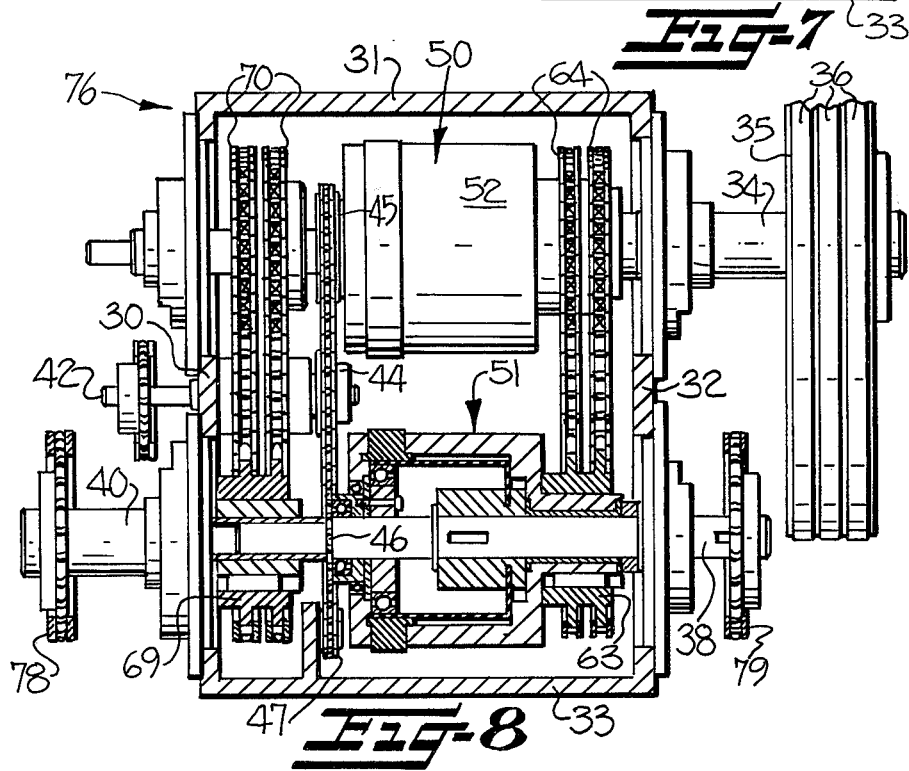

POWER TRANSMISSION APPARATUS

The present invention relates to a power transmission apparatus for variably controlling the speed of two rotatable outputs by oppositely varying the rotational speed of each output in direct proportion to each other, and whereby the cummulative rotational speed of the two outputs remains constant for a given input speed.

U.S. Pat. No. 3,839,767 to Leitner et al discloses a tenter having a skew correcting system, and wherein the speed of the two tenter chains is varied without altering the mean speed thereof to thereby obtain a straightened fabric of substantially uniform yield. More particularly, the disclosed skew correction system includes a skew detecting apparatus, and a pair of planetary drive differentials which are controlled by the skew detection apparatus to speed up one drive chain and to proportionally slow down the other drive chain upon detection of a skewed condition. While this control system represents a significant advance in the art, it is not suitable in all cases, since the disclosed planetary differentials are often unable to handle the substantial power required to drive the tenter chains. Also, numerous belts and chain drives are associated with the planetary differentials, which increase the power consumption and require careful enclosure for safety purposes.

It is accordingly an object of the present invention to provide a power transmission apparatus of the described type, and which overcomes the above-noted disadvantages of the prior transmissions employing planetary differentials.

It is another object of the present invention to provide a power transmission apparatus of the described type, and wherein the two outputs are coaxially aligned, thereby permitting the transmission to be used with existing tenters without requiring substantial structural modification thereof.

These and other objects and advantages of the present invention are achieved in the embodiment illustrated herein by the provision of a power transmission apparatus which comprises first power input shaft means, second correction input shaft means, first and second output shaft means, and first and second differential drive units, each of which comprises a circular spline, a cooperating flexible spline, and a wave generator. The first input shaft means is interconnected to a common first one of the elements of the drive units, and the second correction input shaft means is interconnected to a common second one of the elements, and such that the second ones of the elements uniformly rotate in opposite directions in response to rotation of the second correction input shaft means. A first output shaft means is interconnected to the third one of the elements of the first drive unit, and the second output shaft means is interconnected to the third one of the elements of the second drive unit.

In a preferred embodiment, the transmission apparatus is employed in association with a tenter having a pair of laterally spaced tenter chains adapted to move a fabric forwardly while applying lateral tension thereto, power input means for moving the tenter chains forwardly, means for detecting a skew distortion in the forwardly moving fabric and producing a signal in response thereto. In particular, the transmission means is interposed between the power input means and the tenter chains, and is responsive to a skew correction signal from the detecting means, for oppositely varying the forward speed of the pair of chains in direct proportion to each other.

Some of the objects having been stated, other objects will appear as the description proceeds, when taken in connection with the accompanying drawings in which:

FIG. 4 is a sectional plan view of a power transmission apparatus in accordance with the present invention;

FIG. 5 is a view similar to FIG. 4, but only partially sectioned;

FIG. 6 is a sectional view of the differential drive unit employed with the present invention and taken substantially along the line 6—6 of FIG. 5;

FIG. 7 is a fragmentary sectional view of the various sprsubstantially along the line 7—7 of FIG. 5; and FIG. 8 is a partially sectioned plan view of the second embodiment of the transmission apparatus of the present invention.

Figure 1:
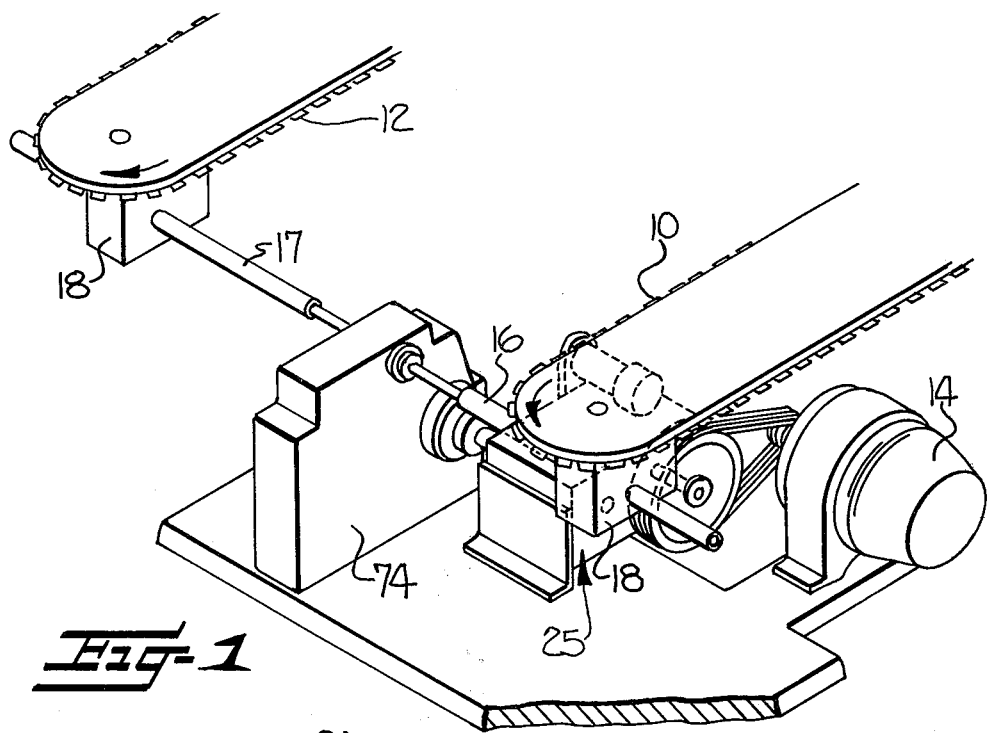
FIG. 1 is a schematic representation of the output side of a tenter, and which includes the novel power transmission apparatus of the present invention.

Referring more specifically to the drawings, FIG. 1 discloses the output side of a generally conventional tenter, and which comprises a pair of laterally spaced, elongate and longitudinally movable fabric engaging tenter chains 10, 12 which are adapted to move a fabric forwardly while applying lateral tension thereto. The chains are driven by an electric motor 14, which acts through the transmission of the present invention, to drive the coaxial shafts 16, 17. The shafts 16, 17 in turn act through a gear box 18 associated with each of the chains 10, 12 to drive the chains in the indicated manner.

Figure 2:
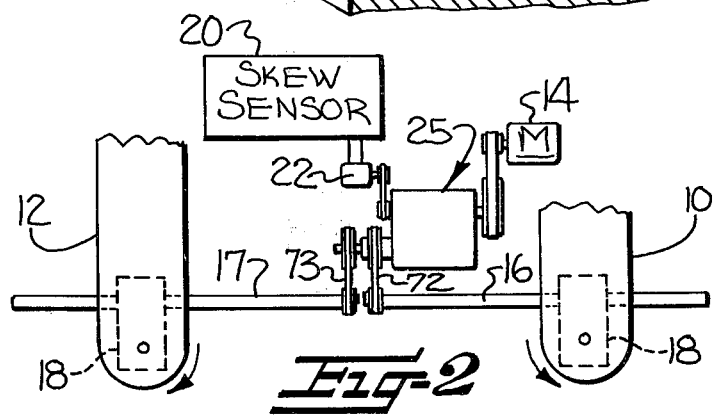
FIG. 2 is a schematic plan view of the apparatus shown in FIG. 1.
Figure 3:
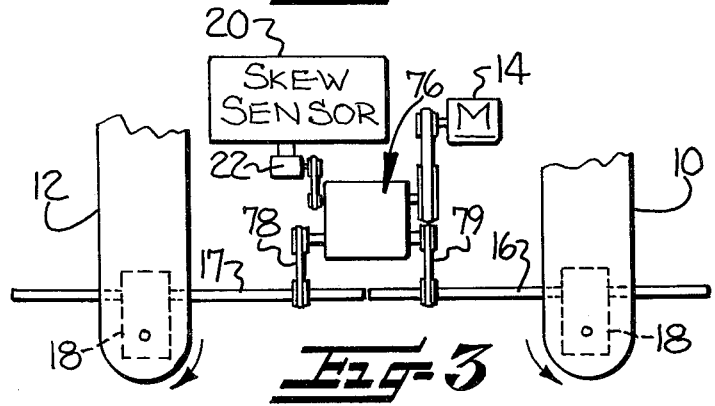
FIG. 3 is a view similar to FIG. 2 but illustrating a second embodiment of the power transmission apparatus.

The tenter also includes a conventional skew distortion detecting device, illustrated schematically at 20 in FIGS. 2 and 3. A device of this type is further described in the above identified patent to Leitner et al, the disclosure of which is incorporated herein by reference. Generally, the device 20 includes means for detecting a distortion in the forwardly moving fabric and for producing a signal in response thereto. The detector acts through a correction motor 22 to oppositely vary the speed of the two chains 10, 12 in direct proportion to each other, and as further described below.

A specific embodiment of a transmission which embodies the present invention is illustrated generally at 25 in FIGS. 2 and 4–7. More particularly, the transmission comprises a box-like enclosed housing 26, having four side walls 30, 31, 32, 33 which enclose the various components of the transmission. The housing is also adapted to receive and contain a suitable quantity of lubricating oil. A first mounting shaft 28 extends transversely through the housing and is rotatably mounted to the side walls 30, 32 of the housing by suitable roller bearings. One end of the shaft 28 rotatably supports a coaxial hollow drive shaft or sleeve 34, which extends through the side wall 32 and mounts a drive pulley 35 exteriorly of the housing. The pulley 35 is in turn operatively connected to the main drive motor 14 of the tenter by the belts 36.

A second mounting shaft 38 is similarly mounted to extend through the side walls 30, 32 of the housing, and is disposed parallel to and laterally spaced from the first mounting shaft 28. One end of the shaft 38 rotatably mounts a hollow output shaft or sleeve 40 which extends through the side wall 30. Also, it will be noted that the corresponding end of the shaft 38 extends axially beyond the sleeve 40 for the purposes hereinafter further described.

A correction input shaft 42 is rotatably mounted to extend through the side wall 30 of the housing, and intermediate the two mounting shafts 28, 38. The end of the correction shaft 42 which is exterior of the housing is operatively connected to the skew detecting means and correction motor 22 (note FIG. 2), and the inner end thereof mounts a sprocket 44. As best seen in FIG. 7, mating sprockets 45, 46 are respectively mounted for rotation on the shafts 28, 38, and a guide sprocket 47 is mounted to the wall 33 of the housing. A chain 48 is disposed about the sprockets in an orientation such that any rotation of the correction shaft 42 will cause the sprockets 45, 46 to rotate an equal amount in opposite directions.

A pair of harmonic differential drive units 50, 51 are respectively mounted on the shafts 28 and 38, with the two units 50, 51 being laterally aligned and similarly oriented. The drive units are themselves known in the art, and are described for example in the U.S. Pat. Nos. 2,906,143 and 2,931,249 to Musser. Generally described, each unit comprises an outer cylindrical portion 52 which mounts a circular outer spline 54, the spline being rigid and including gear teeth on its inner periphery. A flexible cup-shaped spline 56 is disposed coaxially within the cylindrical portion 52, and includes gear teeth on its outer periphery, with the number of teeth on the circular spline 54 being somewhat greater than the number of teeth on the flexible spline 56. An elliptically shaped wave generator 58 is disposed within the flexible spline member 56 and includes a bearing race 59 along its outer periphery. By this arrangement, the wave generator 58 acts to deflect the flexible spline 56 so that the teeth thereof operatively engage the teeth of the circular spline 54 at two angularly spaced locations interspaced by locations at which the teeth are not engaged, note FIG. 6. The wave generator 58 of the first unit 50 is fixed for rotation with the sprocket 45, and the wave generator of the second unit 51 is fixed for rotation with the sprocket 46.

Input power is delivered to each unit 50, 51 from the sleeve 34. More particularly, the outer spline 54 of the first unit 50 is rigidly fixed to the input sleeve 34 via the cylindrical portion 52, and a pair of drive sprockets 62, 63 and chain 64 are provided for delivering the power to a sleeve 65 rotatably mounted on the second shaft 38, and which is similarly interconnected to the outer spline 54 of the second unit 51. The flexible spline 56 of the first unit 50 is fixed to the shaft 28, and the shaft 28 is in turn fixed to the sleeve 40 via the sprockets 68, 69 and chain 70. Thus the sleeve 40 serves as the output for the first drive unit 50. The flexible spline 56 of the second unit 51 is fixed to the shaft 38, and thus the exposed end of the shaft 38 comprises the output of the second drive unit 51. As best seen in FIG. 2, the first output (i.e. sleeve 40) is operatively connected via a sprocket and drive chain assembly 72 to drive the tenter shaft 16, and the second output (i.e. shaft 38) is similarly connected to drive the other tenter shaft 17 by the assembly 73. For safety considerations, the two sprocket and chain assemblies 72, 73 are covered by a suitable housing 74.

In operation, input power is delivered to the input 34 at a substantially constant speed from the motor 14, causing the outer splines 54 of the two units 50, 51 to rotate at a like speed and in a common direction. In the absence of any rotation of the correction shaft 42, the wave generators 58 of the two units are held stationary, and the flexible splines 56 are driven at a slightly increased but uniform speed, the speed increase being caused by the difference in the number of teeth on the outer spline 54 and the flexible spline 56. The rotation of the flexible splines 56 are respectively transmitted to the outputs 40, 38, thereby causing the tenter chains 10, 12 to move forwardly at a uniform speed.

Upon detection of a skew in the fabric by the detector 20, a signal is sent to the motor 22, which causes a corresponding rotation of the correction shaft 42 and wave generators 58. As will be apparent, rotation of the wave generators 58 causes a relative rotational displacement between the outer spline 54 and flexible spline 56 thereby causing the flexible spline 56 to either increase or decrease in rotational speed. Since the two sprockets 45, 46 are mounted so as to rotate in opposite directions, the outputs of the two units 50, 51 will thus change their speed of rotation in opposite directions, and in direct proportion to each other. This serves to similarly change the movement of the tenter chains 10, 12 and to correct the skew distortion without altering the constant lineal speed of the longitudinal center of the fabric.

A second embodiment of the transmission apparatus is illustrated generally at 76 in FIGS. 3 and 8. The transmission 76 is generally similar to the first embodiment 25, with the exception that the output shaft 38 extends through the side wall 32, rather than the side wall 30, and so that the first and second outputs 40, 38 are coaxial, but disposed on opposite sides of the housing 26. The first and second outputs each mount a sprocket 78, 79, respectively, by which the power is transmitted to respective ones of the drive shafts 17, 16. As a further alternative, the transmission 76 may be disposed so that the outputs 40, 38 are coaxial with the tenter drive shafts 17, 16, and are interconnected thereto by suitable splined sleeves (not shown). This latter arrangement has the advantage of eliminating all drive belts or chains between the transmission and the drive shafts of the tenter.

In the drawings and specification, there have been set forth preferred embodiments of the invention, and although specific terms are employed, they are used in a generic and descriptive sense only and not for purposes of limitation.

That which I claim is:

1. A power transmission apparatus for variably controlling the speed of two rotatable outputs by oppositely varying the rotational speed of each output in direct proportion to each other, and whereby the cummulative rotational speed of the two outputs remains constant for a given input speed, said apparatus comprising a box-like enclosed housing defining opposed side walls, a first shaft rotatably mounted to extend at least substantially between said side walls, a second shaft rotatably mounted to extend at least substantially between said side walls and through one of said side walls, and being disposed parallel to and laterally spaced from said first shaft, first and second differential drive units, said first unit being coaxially disposed about said first shaft and said second unit being coaxially disposed about said second shaft, each of said drive units comprising (a) a circular spline having internal gear teeth, (b) a flexible spline coaxially disposed within said circular spline and having external gear teeth, and (c) a wave generator coaxially disposed within said flexible spline and operatively deflecting said flexible spline so that the teeth thereof operatively engage the teeth of said circular spline in at least two angularly spaced locations interspaced by locations at which the teeth are not interengaged, power input means comprising a first sleeve rotatably mounted about said first shaft and extending through one of said housing side walls and being fixed to said circular spline of said first drive unit, a second sleeve rotatably mounted about said second shaft and being fixed to said circular spline of said second drive unit, and means interconnecting said first and second sleeves for concurrent rotation, power output means for said first drive unit comprising means interconnecting said flexible spline of said first drive unit with said first shaft, a third sleeve rotatably mounted about said second shaft and extending through one of said housing side walls, and means interconnecting sai power output means for said second drive unit comprising means interconnecting said flexible spline of said second drive unit with said second shaft, and correction input means comprising a third shaft mounted to extend through one of said housing side walls, and means for interconnecting said third shaft to said wave generator of each of said drive units, and such that the wave generators uniformly rotate in opposite directions in response to rotation of said third shaft.

2. The power transmission apparatus as defined in claim 1 wherein said means for interconnecting said third shaft to said wave generator of each of said drive units comprises a first sprocket mounted to said third shaft, a second sprocket rotatably mounted about said first shaft and operatively connected to said wave generator of said first drive unit, a third sprocket rotatably mounted about said second shaft and operatively connected to said wave generator of said second drive unit, and an endless chain operatively engaging said three sprockets so as to rotate the second and third sprockets in opposite directions.

3. The power transmission apparatus as defined in claim 2 wherein said second shaft and said third sleeve extend outwardly through a common one of the housing side walls.

4. The power transmission apparatus as defined in claim 2 wherein said second shaft and said third sleeve extend outwardly through opposite housing side walls.

* * * * *